(12) United States Patent
Tran

(10) Patent No.: US 7,730,665 B2
(45) Date of Patent: Jun. 8, 2010

(54) AUTOMATIC PLANT AND BIRD WATERER

(76) Inventor: Tri Tran, 1200 Halcyon Cir., Greenville, SC (US) 29615

( * ) Notice: Subject to any disclaimer, the term of this patent is extended or adjusted under 35 U.S.C. 154(b) by 238 days.

(21) Appl. No.: 12/080,221

(22) Filed: Apr. 2, 2008

(65) Prior Publication Data
US 2009/0249689 A1 Oct. 8, 2009

(51) Int. Cl.
A01G 9/02 (2006.01)
(52) U.S. Cl. .................................................. 47/66.6
(58) Field of Classification Search .................. 47/66.6
See application file for complete search history.

(56) References Cited

U.S. PATENT DOCUMENTS

| | | | |
|---|---|---|---|
| 3,542,069 A * | 11/1970 | Ollison | 137/624.21 |
| 4,006,843 A * | 2/1977 | Martinez | 222/68 |
| 4,062,491 A | 12/1977 | von Skwarski | |
| 4,097,020 A | 6/1978 | Sussman | |
| 4,177,604 A * | 12/1979 | Friesen | 47/62 R |
| 4,347,687 A | 9/1982 | Sibbel | |
| 4,574,520 A * | 3/1986 | Arledge | 47/59 R |
| 4,843,758 A | 7/1989 | Raczkowski | |
| D333,763 S | 3/1993 | Collins | |
| 5,212,905 A | 5/1993 | Philoctete | |
| 5,279,071 A | 1/1994 | McDougall | |
| 5,385,300 A | 1/1995 | Sims, Jr. | |
| 5,415,347 A | 5/1995 | Negroni | |
| 5,421,122 A | 6/1995 | Hyndman | |
| 5,493,811 A | 2/1996 | Tobias et al. | |
| 5,511,341 A | 4/1996 | Payne | |
| 5,513,677 A | 5/1996 | McCurry | |
| D381,602 S | 7/1997 | Edwards | |
| 5,836,106 A | 11/1998 | Alex | |
| 6,185,866 B1 | 2/2001 | Enfaradi | |
| 6,216,386 B1 | 4/2001 | LaBahn | |
| 6,318,290 B1 | 11/2001 | Fisher | |
| 6,659,368 B2 * | 12/2003 | Capps | 239/310 |
| 6,789,916 B2 * | 9/2004 | Ruggles | 362/154 |
| 6,845,588 B2 | 1/2005 | Muxlow | |
| 7,082,971 B2 | 8/2006 | Gauthier | |
| 7,222,454 B1 | 5/2007 | Chen | |
| 2009/0249689 A1 * | 10/2009 | Tran | 47/66.6 |

FOREIGN PATENT DOCUMENTS

CN 201015356 Y * 2/2008

* cited by examiner

Primary Examiner—Francis T Palo
(74) Attorney, Agent, or Firm—Robert R. Reed

(57) ABSTRACT

The present invention includes a reservoir on a base supported at an elevation by a support member above a plurality of plants to be watered. A mechanical fill assembly, containing a flush valve and a float connected to a water supply line, automatically keeps the reservoir filled with water for extended periods. The plants are watered by gravity through a plurality of main valves in the reservoir that provide a controlled amount of water to main lines extending to each group of plants. Branch lines extend from each main line that terminate at perforated plant lines at each plant to be watered. A plant valve controls the amount of water each plant will receive on a continuous basis. In a further embodiment of the invention, a bird porch is attached to the reservoir to automatically provided a bird waterer and to provide a bird feeder. Also, a removable fertilizer tray can be provided to fertilize the plants.

5 Claims, 8 Drawing Sheets

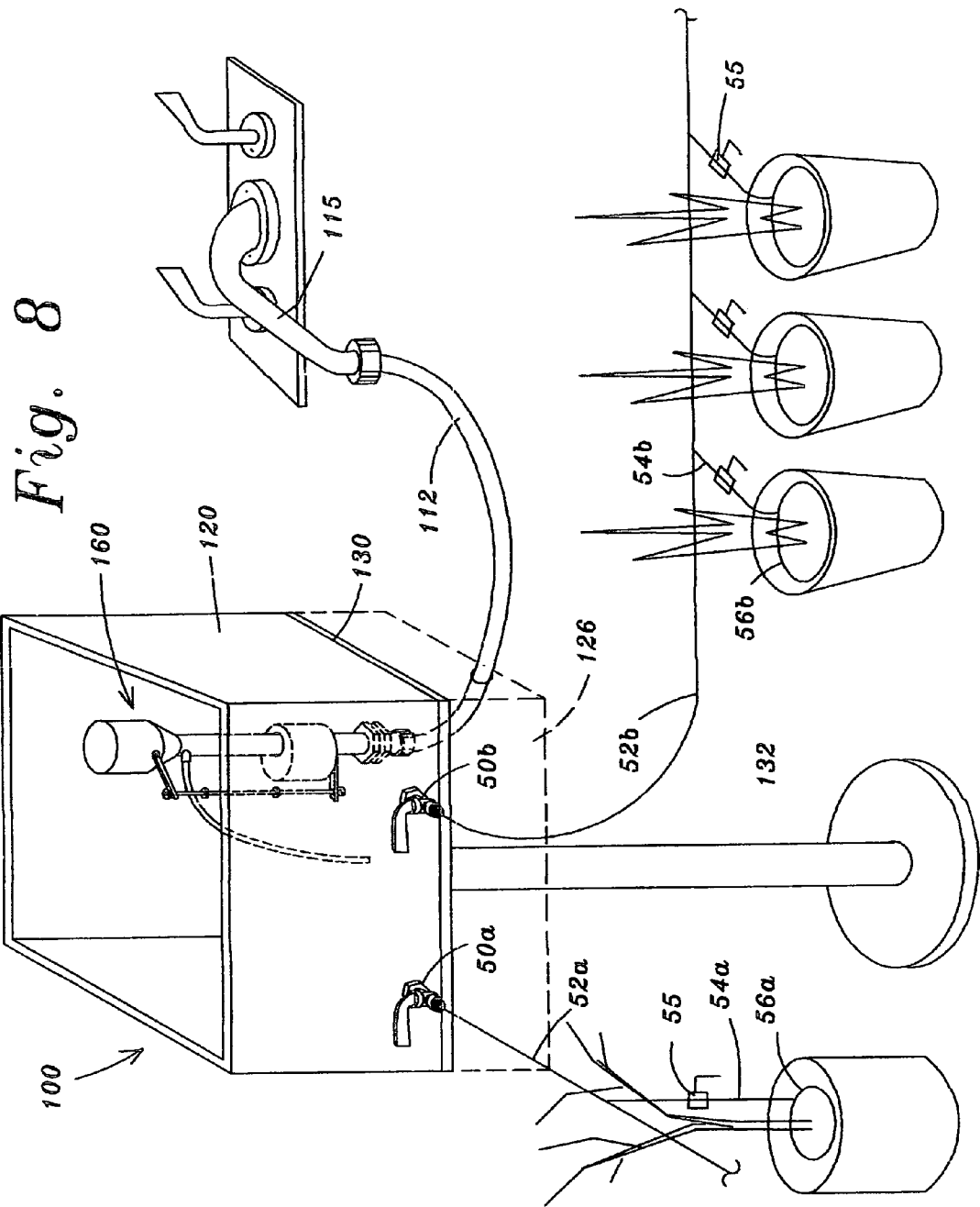

US 7,730,665 B2

AUTOMATIC PLANT AND BIRD WATERER

BACKGROUND OF THE INVENTION

This invention is directed to an automatic plant and bird watering system in combination with a bird feeder and more particularly to an economical design allows each plant to be watered at a different rate by gravity. In particular, the watering system has only mechanical components that provide the necessary amount of water to each plant as needed without any input from the user over long periods of time.

Locally, nationally and globally we are facing water shortages in the time of drought. It can be very difficult to make sure plants get the water they need to survive; much less thrive with wells running dry, reservoirs running low and water bans in effect in many areas. In the growing and maintenance of flowers, shrubs and small trees there is a need to supply water in a controlled amount on a continuous basis. It is estimated that a proper watering system could save seventy five percent of the plants that are lost in gardens each year and up to sixty percent of the water could be saved over conventional watering systems. It is our duty to maintain a water efficient garden with an excellent and efficient system to protect our water resources. Most plants absorb very little moisture through their leaves, as almost all the water they need has to be absorbed through their roots. This allows the particular plant to feed itself as needed without the damaging effects of over watering. These plants, shrubs and small trees are collectively referred to herein as plants. This need is particularly true for the present day new home owner who can't always be there for the care of their plants. They have reduced time and resources available for proper maintenance and care of the numerous plants they have. The plants have not established a good root system and watering is critical until roots are established. These plants must also be fertilized. Those renting their home or apartment are just as responsible as the homeowner in maintaining the plants provided by the owner or purchased by the renter.

The sale of houseplants and related goods comprises a significant element of commercial activity. A compact portable plant watering system that is more productive is essential. Present day homeowners and renters are also absent for long periods of time when on vacation. A means to continue watering and fertilizing the plants is critical during their absence. Commercial establishments and apartment owners must employ others at considerable expense to frequently water and fertilize the plants to maintain an attractive appearance of their investment. In addition, everyone is responsible to maintain the health of our wild birds, which includes providing adequate water and food. A means to easily combine these two tasks would be in the best interest of the public.

There are a number of inventions that have addressed different aspects on the watering of plants on a continuous basis. A first group includes those patents which have an elevated reservoir providing a controlled supply of water through a valve or valves in the watering lines extending from the reservoir.

A list of the patents in this first group is listed below along with a discussion of their importance of these patents in view of the present invention. The first group includes U.S. Pat. Nos. 5,836,106; 5,511,341; 5,385,300; and 4,347,687. The '106 patent discloses a reservoir with a main supply line and branch lines supplying water to a series of potted plants. A valve controls the amount of water to watering devices placed into the soil of the plant. The reservoir includes an entrance which can be opened or closed for receiving water. The '687 patent includes a reservoir with a ventilation tube for measuring the amount of water being supplied to a series of plant trays. A filling pipeline is provided to automatically fill the reservoir using electromagnetically operated valves controlled by a float switch. The '341 patent has a large portable reservoir with adjustable outlet irrigation valves and irrigation tubing extending from each adjustable valve to a plant. The reservoir is refilled by removing a threaded fill plug. The '300 patent has a liquid storage container with a plant feeder outlet to accept a tube. The tube is inserted in a fluid transmission outlet that controls the volume of fluid flow depending on the amount the tube is inserted in the transmission outlet. None of these patents disclose a mechanically operated system to automatically control and refill the water in a reservoir. In addition, no patents were found in this group that incorporate a bird watering and feeding device in combination with the plant watering system.

The second group includes those patents disclosing a continuous supply of water which is regulated by some device to provide the correct amount of water to a plant or plants. This group includes U.S. Pat. Nos. 6,845,588; 5,212,905; 4,843,758; and 4,097,020. The patents of this group have a water supply directly connected to a device or apparatus that regulates the amount of water supplied to each plant. These patents disclose systems that operate without periodic user operation and the water supply line can come directly from the municipal or rural water system. Except for the '905 patent, none of these patent disclose a reservoir for storage of the supply water. Once again, no patents were found in this group that also incorporates a bird watering or feeding feature.

The third group includes those patents which have an apparatus (pumps or pistons) to supply the correct amount of water from a reservoir to a plant or plants. This group includes U.S. Pat. Nos. 7,222,454; 5,415,347; and 4,062,491. The patents of this group all disclose a reservoir. The patents include an apparatus (pump or valve) to supply the correct amount of water from the reservoir to a plant or plants. The '454 patent discloses a submerged pump within the reservoir. A sensor within the reservoir detects a low water level and alerts the user that the reservoir needs to be refilled. The '491 patent discloses several water outflows with valves that are actuated by a time-controlled mechanism and are individually adjustable for different operating cycles. The '347 patent discloses a regulator in a container for regulating the water delivered to the plants. Water is supplied to the container from a portable tank having a handle so it can be carried to a water source. These patents require some type of personal user involvement to keep refilling the reservoir or tank.

The fourth group includes those patents which have a line restriction means or valve to manually set the drip rate from an elevated reservoir to a single plant or tree. This group includes U.S. Pat. Nos. 7,082,971; 6,318,290; 6,216,386; 6,185,866; 5,493,811; 5,513,677; 5,421,122; 5,279,071; Des. 381,602; and Des. 333,763. The patents of this group all have some kind of container, bag or bottle type reservoir, than stores a limited amount of water for watering a single plant through a tube or nozzle device. Control of the amount of water supplied to the plant is either built into the reservoir or the device. The '290 patent discloses a means for supplying water for birds. Once again, these patents do not provide a means for continuous operation without a user filling the reservoir or container.

Inasmuch as the art is relatively crowded with respect to plant watering systems, it can be appreciated that there is a continuing need for and interest in improvements to such watering devices. In this respect, the present invention addresses this need and interest along with the combination of a bird waterer and bird feeder with the plant watering system; plus the ability to add a plant fertilizer to the water.

Accordingly, it is the objective an object of the present invention is to provide a automatic plant watering system with a simple and rugged design that is ready to put into service, safe to use and designed to refill itself without user input over a long period of time.

An essential object of the present invention is to provide a plant watering system having only mechanical components to refill the water reservoir using the pressure of the water supply system.

Another object of the present invention is to provide an automatic plant watering system in combination with an automatically refilled bird watering tank.

Yet a further object of the invention is to provide a plant watering system that does not depend on electronic components to operate.

An additional object of the present invention is to provide a plant watering system that waters a number of indoor or outdoor patio and garden plants at the same time but allows each plant to receive the correct amount of water for proper growth and maintenance.

A second additional object of the invention is to provide an ability to chemically add nutrients to the water to fertilize the plants and further enhance their growth.

Another additional object is to provide an automatic plant and bird waterer having an attractive appearance when placed into service.

A further additional object of the invention is to provide a plant watering system that can be used indoors as well as outdoors.

SUMMARY OF THE INVENTION

The present automatic watering system invention includes a reservoir on a base supported at an elevation by a support member above a plurality of plants to be watered. A mechanical fill assembly, containing a flush valve and a float connected to a water supply line, automatically keeps the reservoir filled with water for extended periods. The plants are watered by gravity through a plurality of main valves in the reservoir that provide a controlled amount of water up to as much as needed for main lines extending to each group of plants. Branch lines extend from each main line that terminate at perforated plant lines at each plant to be watered. A plant valve controls the amount of water each plant will receive on a continuous basis up to as much as needed for any size plant. In a further embodiment of the invention, a bird porch is attached to the reservoir to automatically provided a bird waterer and to provide a bird feeder. Also, a removable fertilizer tray can be provided to fertilize the plants.

In one embodiment of the invention an automatic watering system comprises a reservoir supported at an elevation above a plurality of plants by a base and a support member. A fill assembly within said reservoir is connected to a water supply line and has a water column with a float to operate a flush valve to maintain water in said reservoir without user input. A plurality of main lines and branch lines are provided to transport water to perforated plant lines for watering each respective plant by gravity. There are an equal number of branch lines and plant lines corresponding to the number of plants to be watered. A plurality of main valves, connecting said reservoir with each main line, regulate the amount of water flow in each respective main line. A branch valve is installed in each branch line to regulate the amount of water delivered to each respective plant line. Therefore, each plant automatically receives a correct amount of water on a continuous basis.

In one aspect of the present invention the fill assembly further includes a switch arm which is rotated downward to operate the switch valve, so that water flows into said reservoir through a fill tube connected to the flush valve. The switch arm is rotated upward to stop the flow of water into the reservoir. A float arm is rigidly attached to the float. A switch rod, having two upper stops and two lower stops, extends between the float arm and the switch arm. The upper stops retain the switch rod at the switch arm and the lower stops retain the switch arm at the float arm. The float moves to a low water position to fill the reservoir and to a high water position to stop the water flow into the reservoir.

In another aspect, the present invention further comprises a bird porch attached to the reservoir and supported by said base for feeding and watering birds. In addition, a bird perch area, being an extension of said base, provides an area for the feeding birds to land.

In another embodiment of the invention a combination plant and bird waterer with a bird feeder is provided. The reservoir is again supported at an elevation above a plurality of plants by a base and a support member. The fill assembly within said reservoir is connected to a water supply line and has a water column with a float to operate a flush valve to automatically maintain water in the reservoir without input from a user. A plurality of main valves in said reservoir supply water to a plurality of main lines and a plurality of branch lines extend from each main line. A perforated plant line terminates each branch line for watering a respective plant. A branch valve in each respective branch line controls the water flow in said perforated plant line. In addition, a removable bird porch, attached to the reservoir and supported by the base, is provided for feeding and watering birds.

In a further embodiment of the invention an assembly of a plant waterer and fertilizer and a bird waterer and feeder is provided comprising the reservoir with a reservoir lid supported at an elevation above the plurality of plants by the base and the support member. The fill assembly within the reservoir is connected to a water supply line and again has a water column with a float to operate a flush valve to automatically maintain water in the reservoir without input from a user. A plurality of main valves in the reservoir supply water to a respective main line and a plurality of branch lines extending from each main line. A perforated plant line terminates each branch line to water a respective plant. A branch valve in each respective branch line regulates the water flow in the perforated plant line. A bird waterer and feeder is attached to said reservoir. The bird waterer has a bird watering tank and a bird landing to support the birds while drinking. The bird feeder holds feed for the birds while feeding. A removable fertilizer tray, supported within said reservoir above the water, contains a liquid chemical fertilizer material and includes a timer valve extending from the fertilizer tray for supplying fertilizer in a controlled amount to the water.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein:

FIG. 8 is a perspective view of the automatic plant watering system for internal use with the water supply coming from an internal water faucet.

DESCRIPTION OF A PREFERRED EMBODIMENT

Figure 1:
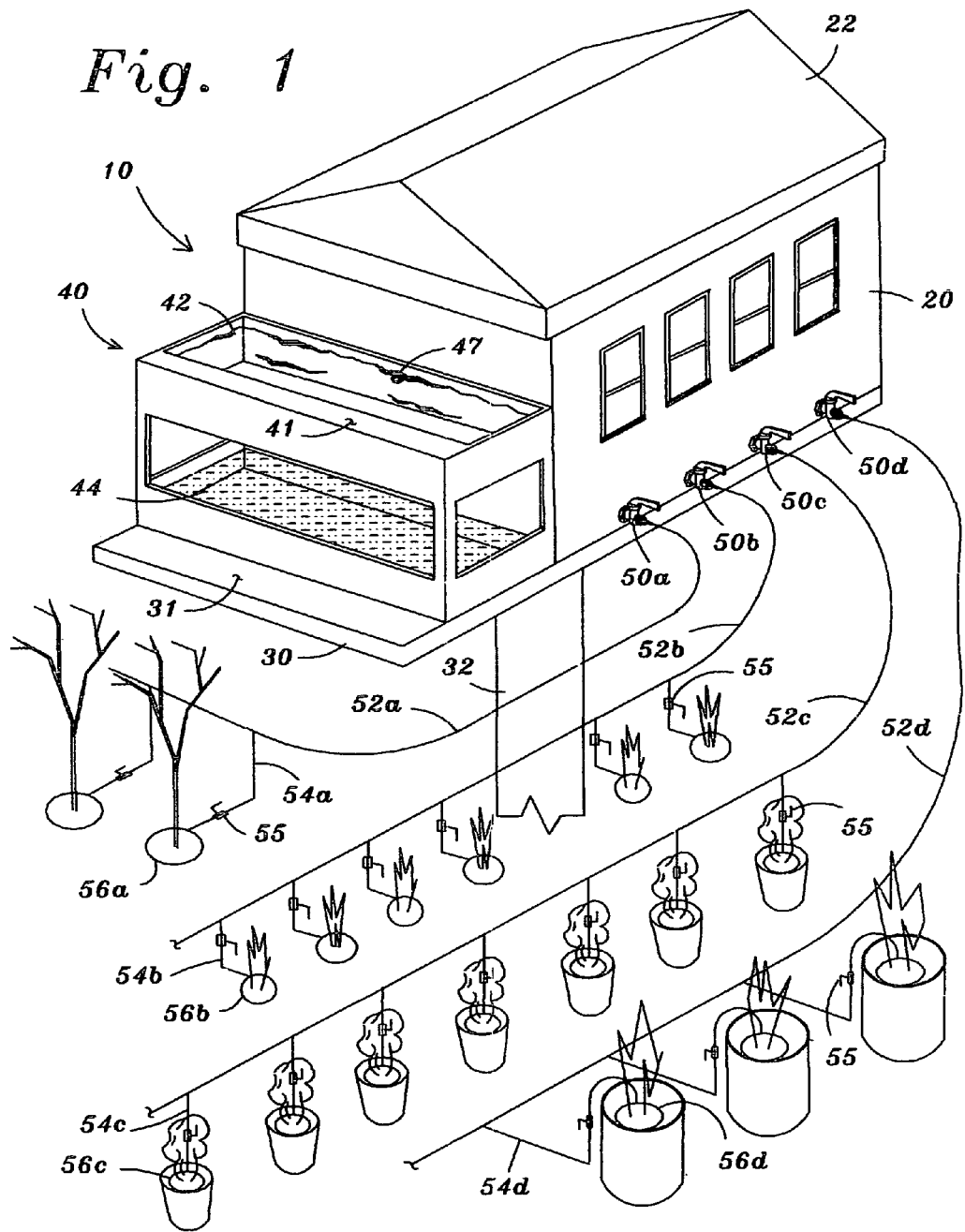
FIG. 1 is a perspective view of the "automatic plant and bird waterer with a bird feeder" of this invention showing an elevated water reservoir with a reservoir lid supplying water to a series of plants through main valves and main lines extending to branch lines and valves, wherein the branch valves control the water flowing to plant lines. A bird porch including a bird waterer and a bird feeder are attached to the reservoir.

Referring now in more detail to the drawings, the invention will now be described in more detail. A perspective view of the automatic watering system 10 is illustrated in FIG. 1. A reservoir 20 containing water is located on a base 30 and supported by a support member 32 above a plurality of plants to be watered. The reservoir can have a reservoir lid 22 to keep the water free of debris and other foreign objects. The reservoir is automatically refilled with water; to be described in more detail below (see FIG. 4). Four different groups of plants are watered through four main valves 50a-50d that supply four main lines 52a-52d. The number of main valves and main lines can vary within the scope of this invention. Each main line has a plurality of branch lines corresponding to the number of plants to be watered by the particular main line. For example, main line 52a has a plurality of branch lines 54a, and so on for 54b-54d. Each branch line 54a-54d is terminated at a plant line 56a-56d that encircles a respective plant. The lines are perforated to allow the plants to be watered. Each plant has a plant valve 55 located somewhere in the branch line, between the main line and the branch line or between the branch line and the plant line. The plant valves are individually adjusted to control the amount of water delivered to each plant depending on the type and size of the plant.

In a further embodiment of automatic watering system 10 the base is extended to provide support for a bird porch 40. The bird porch has an upper portion providing a bird waterer 42 and a lower portion providing a bird feeder 44. The bird waterer is automatically supplied with water from reservoir 20 through bird tank valve 47. In addition, a bird landing 41 provides an area for the birds to land when drinking from the bird waterer. The base is further extended to provide a bird perch area 31 for the birds using the bird feeder. The reservoir, reservoir lid and bird porch are configured and inscribed to have the appearance of a house. This makes the automatic watering system have a more attractive appearance for the environment where it is to be used.

Figure 2:
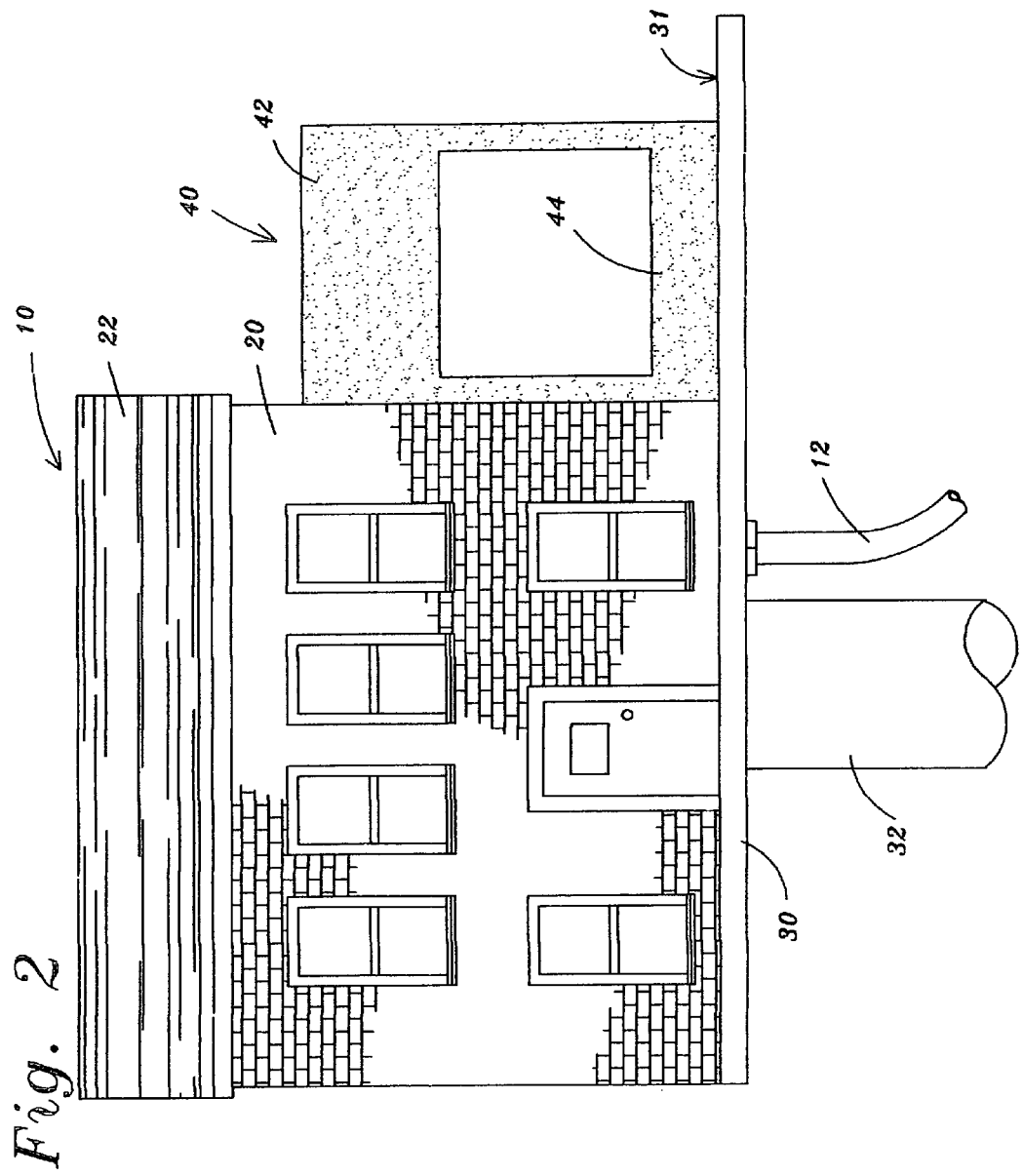
FIG. 2 is a front elevation view of the combination automatic plant and bird waterer with a bird feeder of this invention showing the reservoir and reservoir lid along with the bird porch inscribed to have the appearance of a house. The combination as illustrated is resting on a flat base supported by a support member.

A front elevation view of automatic watering system 10 is illustrated in FIG. 2. Once again the reservoir 20 is located on base 30 supported by support member 32. The valves and watering lines extend from the rear of the reservoir and are not shown in this view for clarity. A water supply line 12 supplies water to the reservoir. Bird porch 40 is attached to the one lateral side of the reservoir and is supported by an extension of base 30. As previously discussed, the bird porch has an upper portion being bird waterer 42 and a lower portion being bird feeder 44. A further extension of the base provides bird perch 31. This elevation view of FIG. 2 clearly shows the configuration of the automatic watering system to be inscribed to have the appearance of a house or bird house. This design is used to provide an attractive physical appearance for the automatic watering system when used in a garden or yard.

Figure 3:
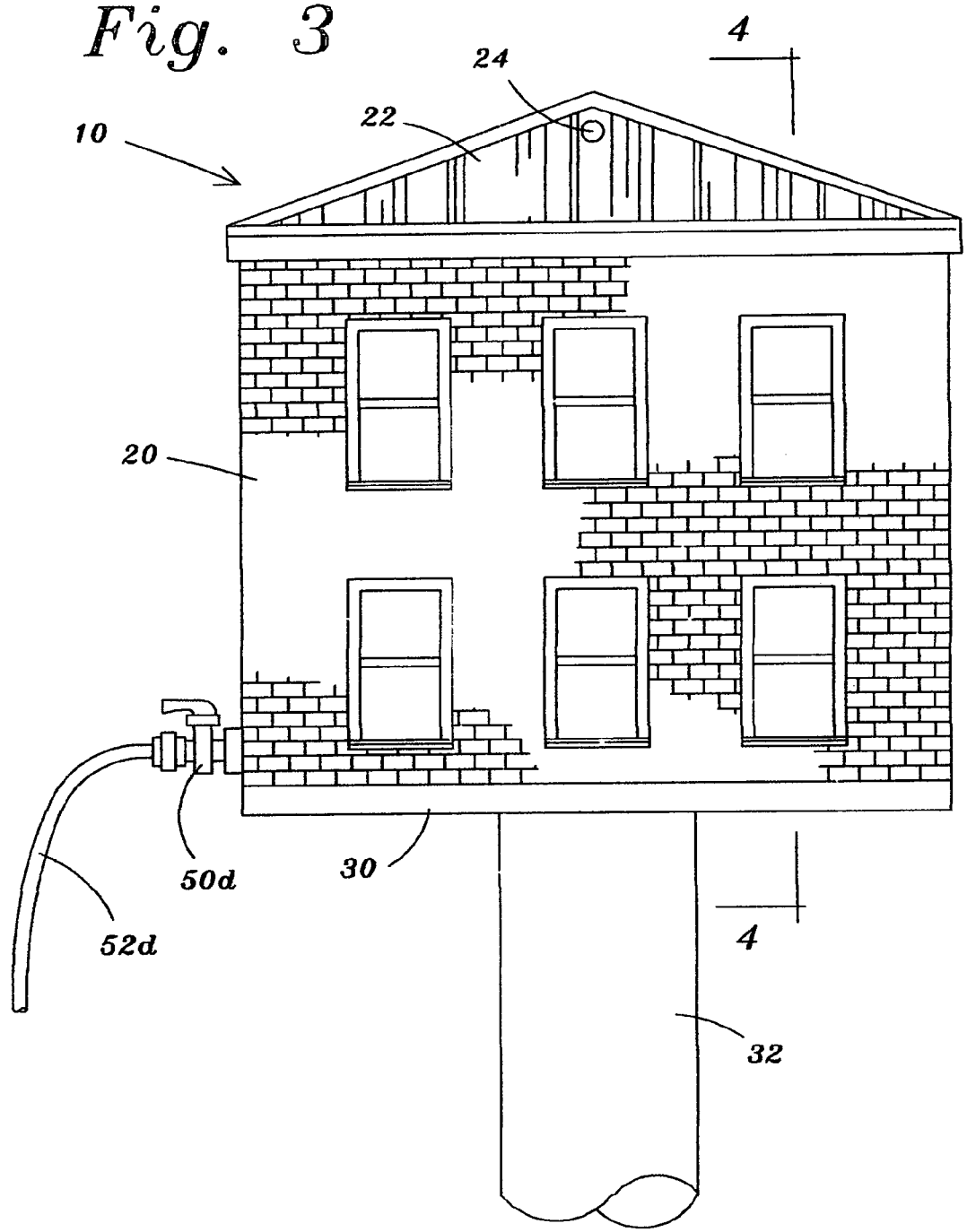
FIG. 3 is a left side elevation view of the automatic plant and bird waterer with a bird feeder of FIG. 2 showing the reservoir and lid inscribed to have the appearance of a house. A main valve extends from the rear of the reservoir.

A left side elevation view of automatic watering system 10 is illustrated in FIG. 3. Reservoir 20 and reservoir lid 22 are again inscribed to have the appearance of a house or bird house. One of the main valves extending from the rear of the reservoir is visible in this left side elevation view. The visible valve in this view is main valve 50d. Main line 52d extends from this main valve. An air vent 24 is provided to keep the reservoir from having a negative air pressure. The reservoir is again carried by base 30 which is supported by support member 32.

Figure 4:
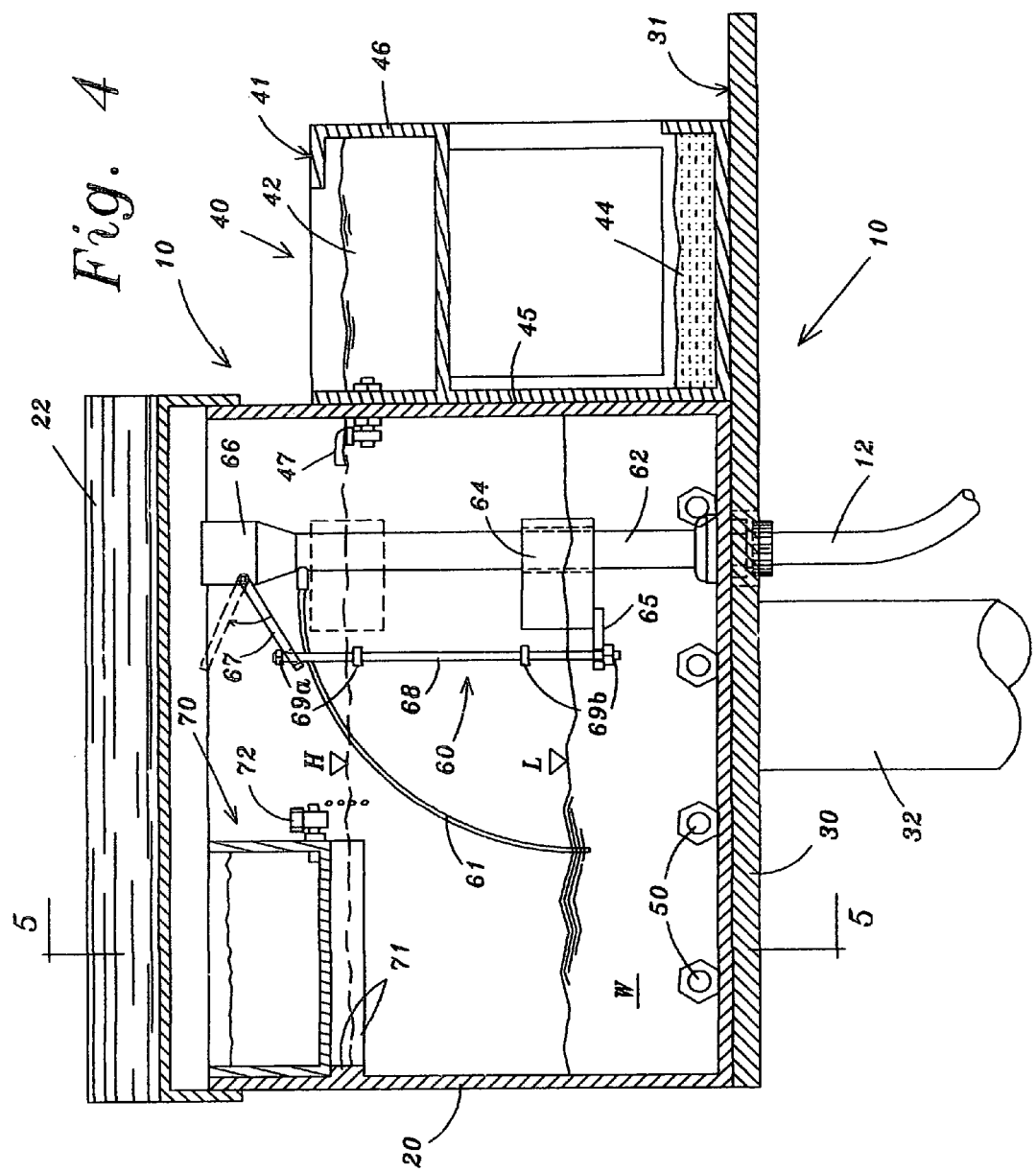
FIG. 4 is a cross-sectional view, taken along line 4-4 in FIG. 3, showing an internal fill assembly, a water supply line and an internal fertilizer tray with a timer valve.

The interior mechanical components of automatic watering system of this invention are illustrated and discussed in detail by referring to the cross-sectional view of FIG. 4. This cross-sectional view is taken along line 4-4 in FIG. 3. Reservoir lid 22 rests on the top edge of reservoir 20 and can be removed for cleaning and repairs. Bird porch 40 is attached to the reservoir and rests on an extension of base 30. An adhesive strip 45 helps to hold the bird porch attached to the reservoir. A further extension of the base provides bird landing area 31 for the birds using bird feeder 44. The top portion of the bird porch forms bird waterer 42 with bird landing 41 for the birds to land and drink. A watering tank 46 is formed by the sides and bottom of the bird waterer. A watering tank valve 47 is opened to refill the watering tank each time the reservoir is filled with water.

The reservoir is continuously refilled with water by a fill assembly 60 attached to a water supply line 12 entering the bottom of the tank, as illustrated in this cross-sectional view of FIG. 4. The fill assembly is similar to a standard flush valve or fill valve used on a toilet tank. A water column 62 extends upward into the tank to a flush valve 66 above a high water mark "H" as shown by the dashed lines. Water flows into the reservoir when a switch arm 67 is rotated to a downward position corresponding to a low water mark "L" as shown. Water stops flowing when the switch arm is rotated to an upward position corresponding to the high water mark. The switch arm is rotated by a switch rod 68 extending through the switch arm. Upper stops 69a on the switch rod make contact with the switch arm to rotate the switch arm. The switch rod is forced upward or downward by a float arm 65 extending from a float 64. Switch rod 68 extends through the float arm and the float arm makes contact with lower stops 69b on the switch rod. Water starts flowing into the reservoir with the position shown and the float moves upward as the reservoir fills and stops when the switch arm is rotated into an upward position by the stops on the switch rod, as illustrated by the dashed lines. The preferred capacity of the automatic watering system is 0.5 gallons per minute delivered to the plants from each main valve and distribution lines from a 5-10 gallon reservoir. The reservoir size and number of valves can be selected to cover the number, size and water requirement of all the plants to be watered. A fill tube 61 is also included as part of the standard fill valve used in the industry. A typical fill valve of the industry is the "anti-siphon fill valve" as manufactured by Fluidmaster, Inc. of San Juan Capistrano, Calif. 92687.

A further aspect of the invention provides for an opportunity to fertilize the plants being watered. A fertilizer tray 70 located above the high water level is carried in the reservoir by tray supports 71 built into three sides of reservoirs 20. The fertilizer tray can be easily added or removed from the reservoir. A liquid chemical fertilizer is added to the fertilizer tray and a timer valve 72 extends from the fertilizer tray to slowly discharge the liquid fertilizer into the water "W". The preferred capacity of the fertilizer tray is up to 80 ounces. The timer valve has a graduated scale and is manually adjusted to allow the correct amount of fertilizer to be added to the water in the reservoir. The timer valve can be set to discharge 64 ounces of liquid fertilizer over a period of 10 to 16 days. Fertilized water flows to the plants through main valves 50. Bird tank valve 47 should be closed during the time when the plants are being fertilized to protect the birds from the possible harmful chemicals in the fertilizer material being used. Watering tank 46 can be manually filled during plant fertilizing time, if necessary.

Figure 5:
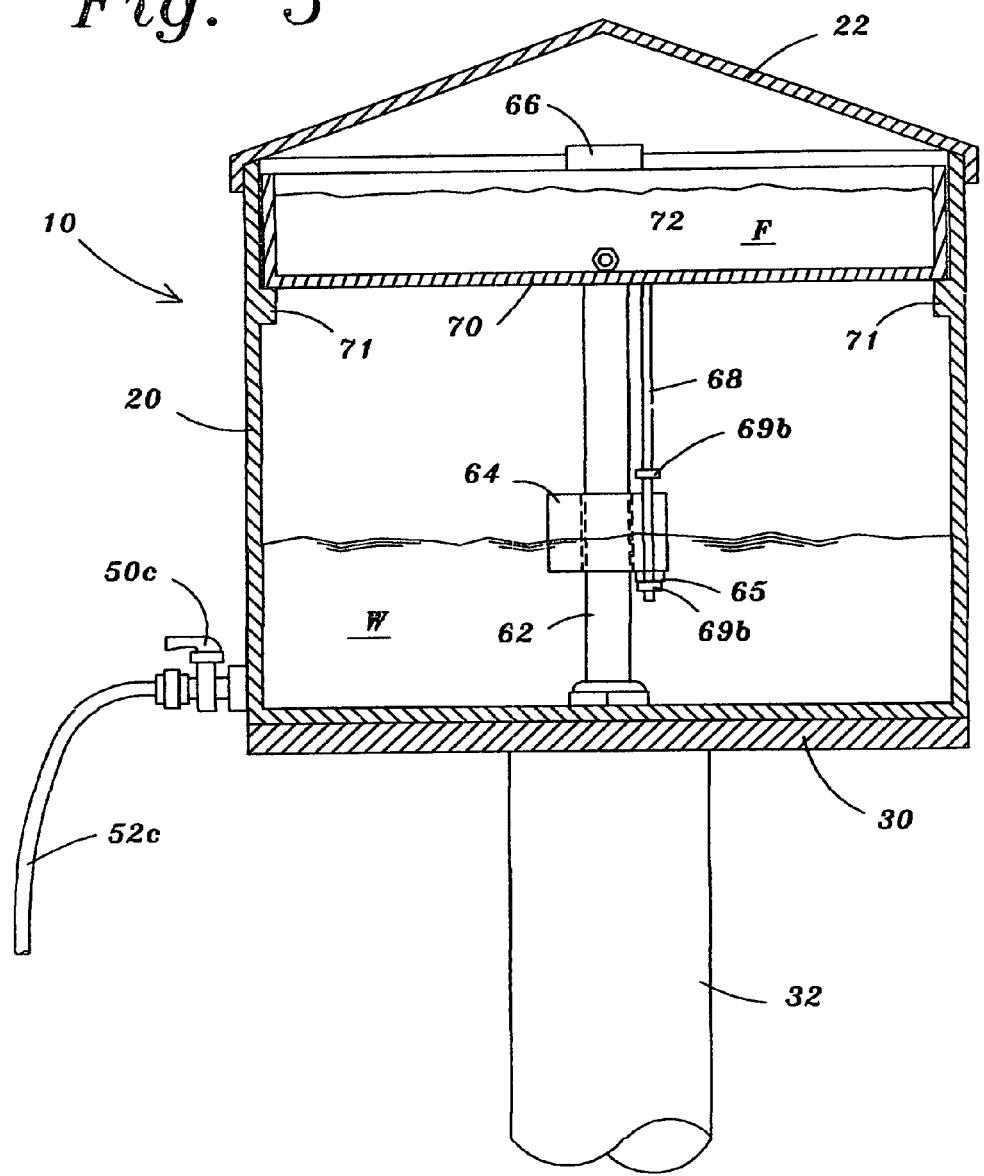
FIG. 5 is a cross-sectional view, taken along line 5-5 in FIG. 4, showing the internal fill assembly and the fertilizer tray supported by tray supports built into the walls of the reservoir.

A side view of the components interior to reservoir 20 is illustrated in the cross-sectional view of FIG. 5. This view is taken along line 5-5 in FIG. 4. Removable reservoir lid 22 provides access to the reservoir and protects the interior of the reservoir from debris. Once again, the reservoir is carried by base 30 which is supported by support member 32. Main valve 50c extends from the rear side of the reservoir and supplies main line 52c with water when opened. Fertilizer tray 70 extends the full interior width of the reservoir and is supported on both ends by tray supports built integral with the walls of the reservoir. Timer valve 72 controls the amount of fertilizer "F" to be discharged into the water "W". Water column 62 extends upward from the bottom of the reservoir to flush valve 66 at the top. Float 64 is free to move up or down on the water column and float arm 65 contacts one of the lower stops 69b on the switch rod 68 to rotate the switch arm (not shown) attached to the flush valve.

Figure 6:
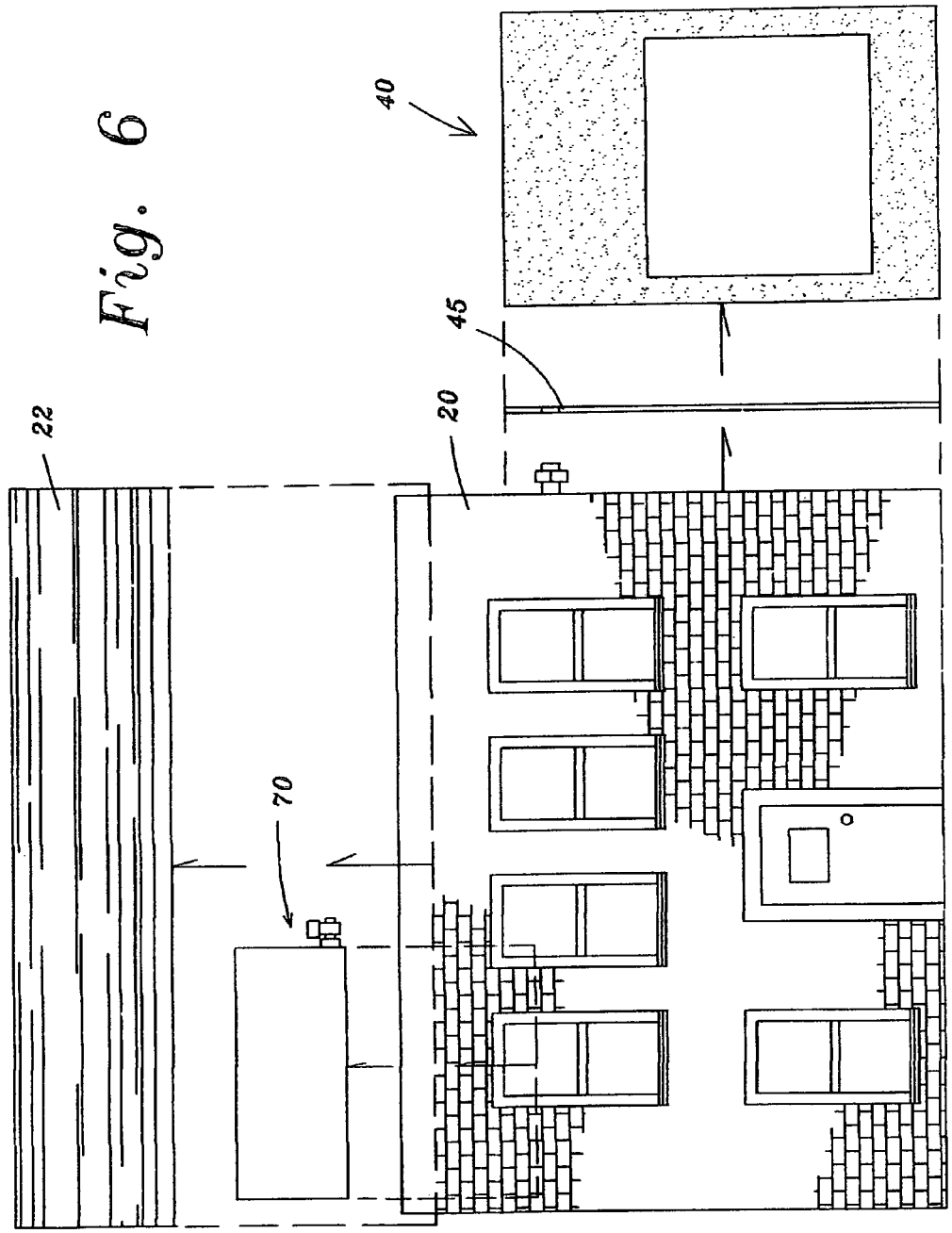
FIG. 6 is an exploded elevation view of the plant and bird waterer with the optional components of the invention being displaced from the reservoir.

The components essential to the watering of plants include the elevated reservoir, the internal fill assembly connected to the water supply line and the water distribution system, including the valves and lines to the plants. Reservoir lid 22, fertilizer tray 70 and bird porch 40 can be removed, as illustrated in FIG. 6. Adhesive strip 45 allows the bird porch to be easily removed. In addition, bird tank valve 47 would be closed. These essential plant watering components are those used for the internal automatic plant watering system 100, as discussed below and illustrated in FIG. 8.

Figure 7:
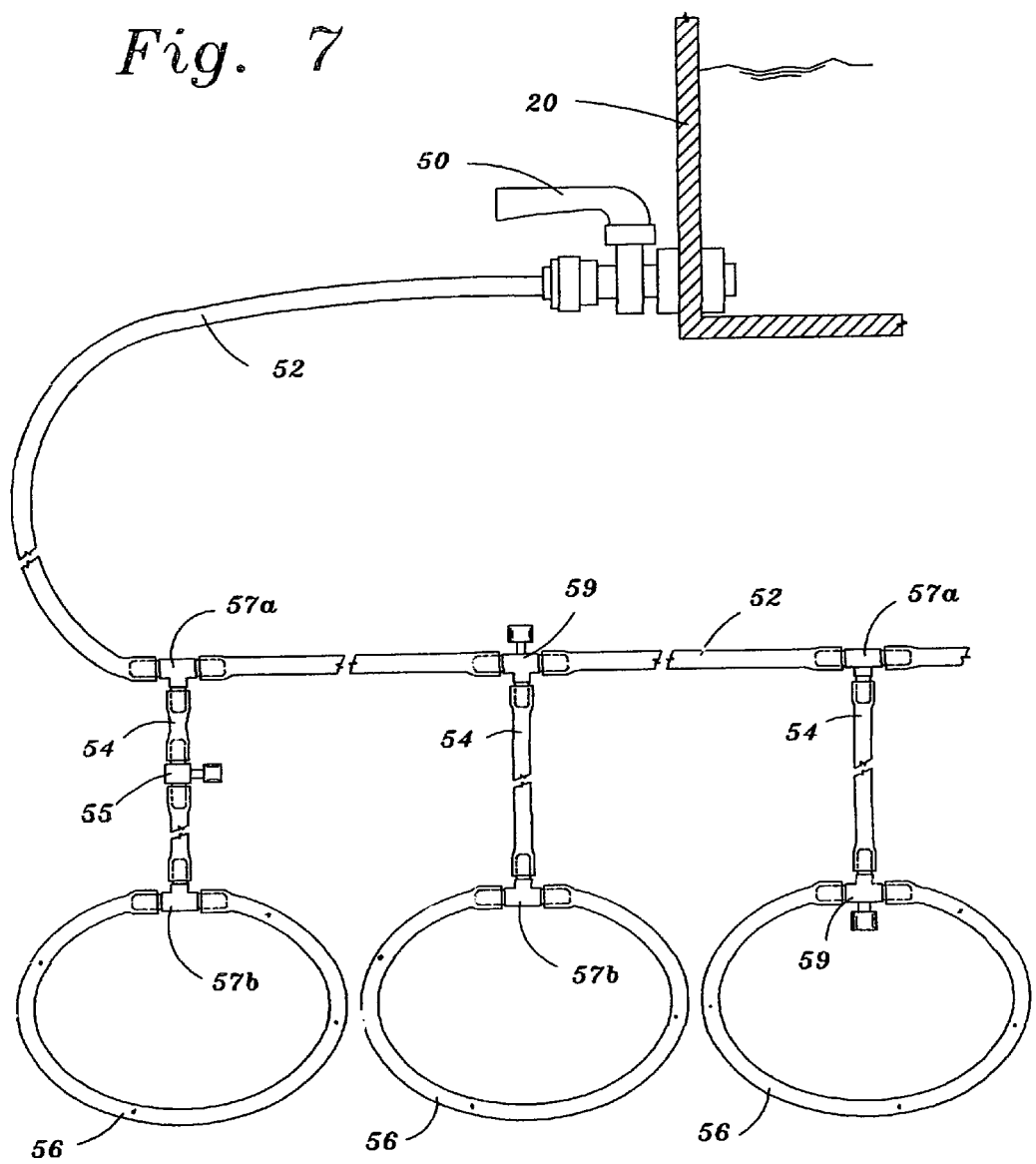
FIG. 7 is a schematic view of the arrangement of the valves, lines and connectors necessary for the controlled watering of individual plants.

Further details of the water supply lines and valves extending from the reservoir to the individual plants are now discussed and illustrated in FIG. 7. A typical main valve 50 and typical main line 52 extends from reservoir 20. Branch tees 57a installed in the main line to lead to branch lines 54. The branch lines terminate at a plant tee 57b which lead to perforated plant lines 56 that encircle the individual plants to be watered. Typical main lines and branch lines in the industry are manufactured by Watts Water Technologies, Inc. of North Andover, Mass. 01845. Typical plant lines in the industry are the "precision drip lines" manufactured by Orbit Irrigation Products, Inc. of North Salt Lake, Utah 84054. The amount of water to be supplied to each plant is controlled by main valve 50 and another valve at the location of the plant. A typical main valve in the industry is the "quick connect straight valve" manufactured by Watts Water Technologies, Inc. of North Andover, Mass. 01845. The valve at the plant can be either a plant valve 55 in the branch line or a tee valve 59 replacing the branch tee or the plant tee. A branch tee valve 59a can replace branch tee 57a or plant tee valve 59b can replace plant tee 57b. A typical plant valve in the industry is the "barbed shut-off valve" manufactured by Orbit Irrigation Products, Inc. of North Salt Lake, Utah 84054. The location of the plant valves is critical in allowing the amount of water to each plant to be easily controlled. The layout and location of the plants in one system may require different plant valve locations for each plant or group of plants. A typical branch tee or plant tee available in the industry is called the "AQUA culture T-Way connector" marketed by Wal-Mart Stores, Inc. of Bentonville, Ark. 72716.

An automatic watering system 100 designed for internal use is illustrated in FIG. 8. A reservoir 120 is carried on a base 130 supported by a support member 132 at an elevation above the plants to be watered. A fill assembly 160 within the reservoir keeps the reservoir filled with water for extended periods of time without input from the user. A water supply line 112 can be connected to any hose connection or from a water faucet 115, as illustrated. Main valves 50a and 50b control the amount of water in the main lines 52a and 52b respectfully. The main supply lines have branch lines 54a and 54b extending to each plant to be watered. The branch lines each terminate at a plant line 56a or 56b. Plant valves 55 associated with each branch line helps control the amount of water received by each plant. Once again, plant valves can be located in the branch lines, between the main line and the branch lines or between the branch lines and the plant lines. An alternate method of supporting the reservoir is to provide an extension of the sides of the reservoir to provide a skirt 126 below the bottom of the reservoir, as shown by the broken lines. With the skirt, reservoir 120 can be supported on a kitchen counter top and the water supply line can enter the side of the skirted reservoir and extend to the bottom of the reservoir.

While a preferred embodiment of the invention has been described using specific terms an a particular prior art reference, such description is for illustrative purposes only, and it is to be understood that changes and variations may be made without departing from the spirit or scope of the following claims. Of particular interest is the number of main valves and their location in the reservoir. Main valves can also be located on numerous sides and/or in the bottom of the reservoir within the scope of the invention. In addition, the reservoir can be supported by brackets extending from a vertical surface or the base can be hung on wires or cables from above.

The foregoing is considered to be illustrative only of the principles of the invention. Since numerous modifications and changes will readily occur to those skilled in the art, it is not desirable to limit the invention to the exact construction and operation shown and described. Accordingly, all suitable modifications and equivalents may be resorted to, falling within the scope of this invention. All equivalent relationships to those illustrated in the drawings and described in the specifications are intended to be encompassed by the present invention.

What is claimed is:

1. An assembly of a plant waterer and fertilizer and a bird waterer and feeder comprising:

a reservoir with a reservoir lid supported at an elevation above a plurality of plants by a base and a support member;

a fill assembly within said reservoir connected to a water supply line and having a water column with a float to operate a flush valve to automatically maintain water in said reservoir without input from a user;

a plurality of main valves in said reservoir for supplying water to a plurality of main lines and a plurality of branch lines extending from each main line;

a perforated plant line that terminates each branch line to water a respective plant;

a branch valve in each respective branch line to regulate the water flow in said perforated plant line;

a bird waterer and bird feeder attached to said reservoir, wherein said bird waterer has a bird watering tank and a bird landing to support the birds while drinking and said bird feeder for holding feed for the birds while feeding; and a removable fertilizer tray supported within said reservoir above the water containing a liquid chemical fertilizer material including a timer valve extending from said fertilizer tray to discharge a controlled amount of said fertilizer material into the water to fertilize the plants.

2. The combination of claim 1 wherein said fill assembly includes:

a switch arm which is rotated downward to operate said flush valve, so that water flows into said reservoir through a fill tube connected to said flush valve, and is rotated upward to stop the flow of water into said reservoir a float arm rigidly attached to said float; and a switch rod having two upper stops and two lower stops extending between said float arm and said switch arm, wherein said upper stops retain said switch rod at said switch arm and said lower stops retain said switch arm at said float arm and wherein said float moves to a low water position to fill said reservoir and to a high water position to stop the water flow into said reservoir.

3. The assembly of claim 1 including a bird watering tank valve between said reservoir and said bird waterer for automatically supplying water from said reservoir to said bird watering tank when said tank valve is open and said timer valve is closed.

4. The system of claim 1, wherein said reservoir includes tray supports built integrally with said reservoir for removeably supporting said fertilizer tray above the water.

5. The system of claim 1 including a timer valve extending from said fertilizer tray for supplying a controlled amount of said fertilizer material into said water.

* * * * *

UNITED STATES PATENT AND TRADEMARK OFFICE
CERTIFICATE OF CORRECTION

PATENT NO.       : 7,730,665 B2                                    Page 1 of 1
APPLICATION NO.  : 12/080221
DATED            : June 8, 2010
INVENTOR(S)      : Tri Tran It is certified that error appears in the above-identified patent and that said Letters Patent is hereby corrected as shown below:

Title Page Item (76) Inventor: should read

Tri Tran, 1200 Halcyon Cir. #205
Greer, SC (US) 29650

Signed and Sealed this

Seventh Day of September, 2010

David J. Kappos
*Director of the United States Patent and Trademark Office*